Nov. 26, 1940.　　　R. T. REGESTER　　　2,222,595
MEANS FOR DISPOSING VARIABLE INFLOW LIQUID FROM A CONDUIT
Filed Dec. 22, 1939　　　3 Sheets-Sheet 1
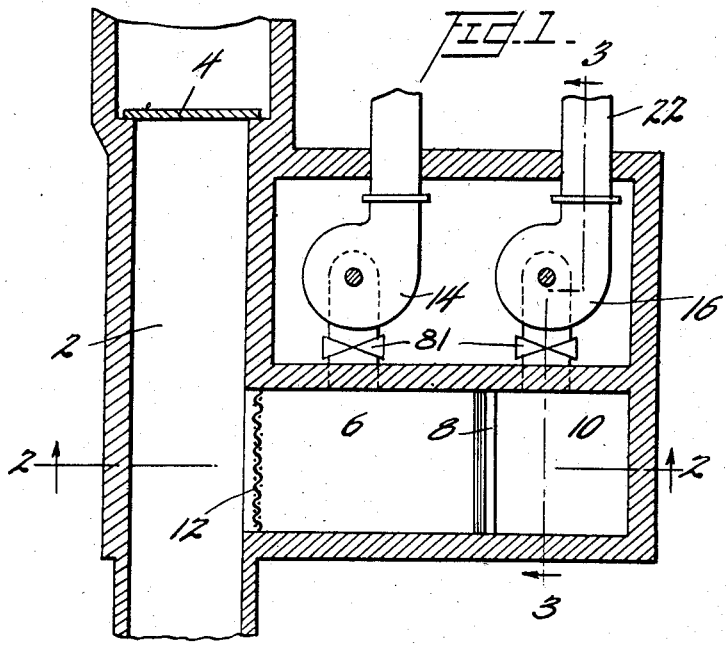
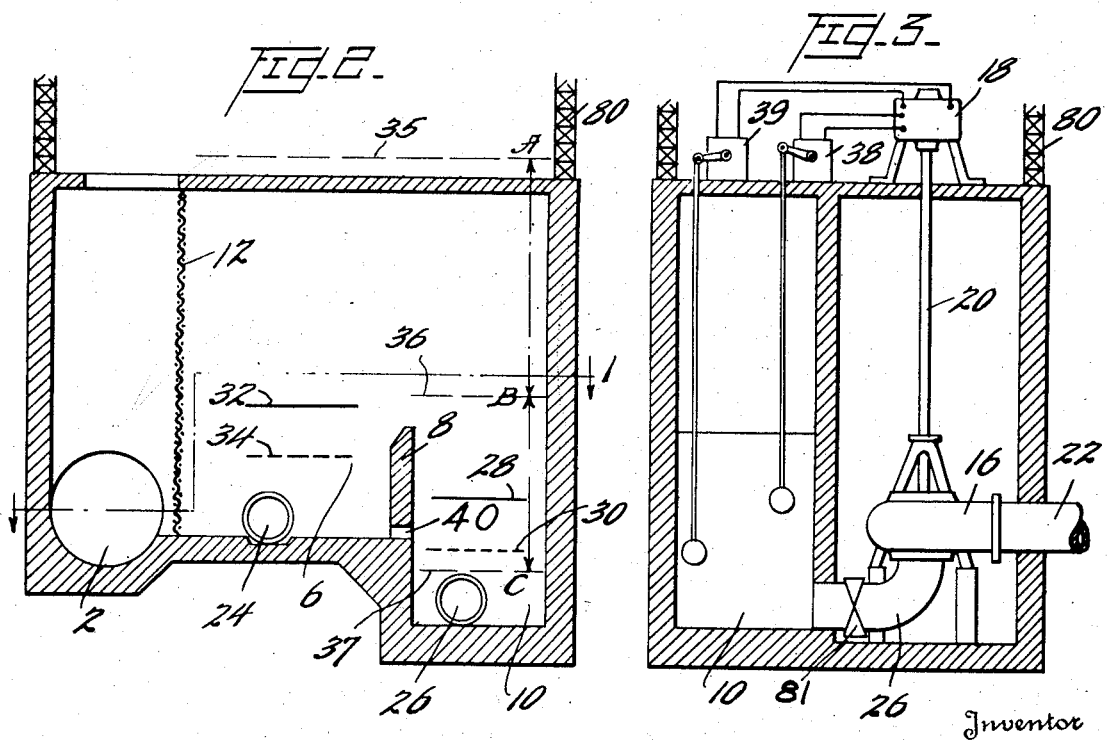
Inventor
ROBERT T. REGESTER
By Chas. Silver
Attorney

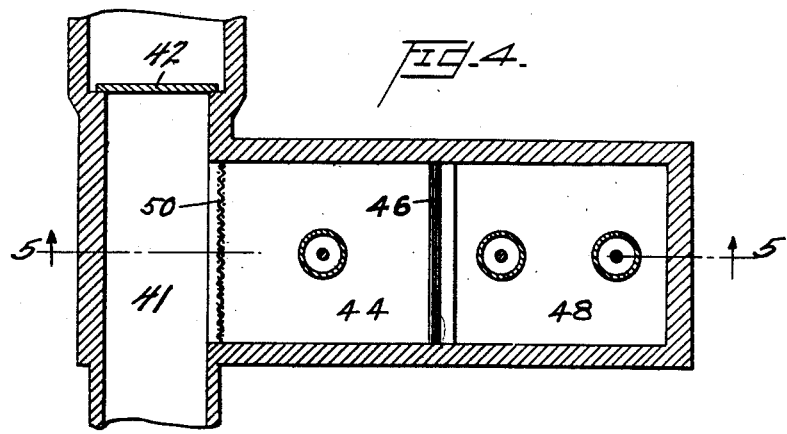
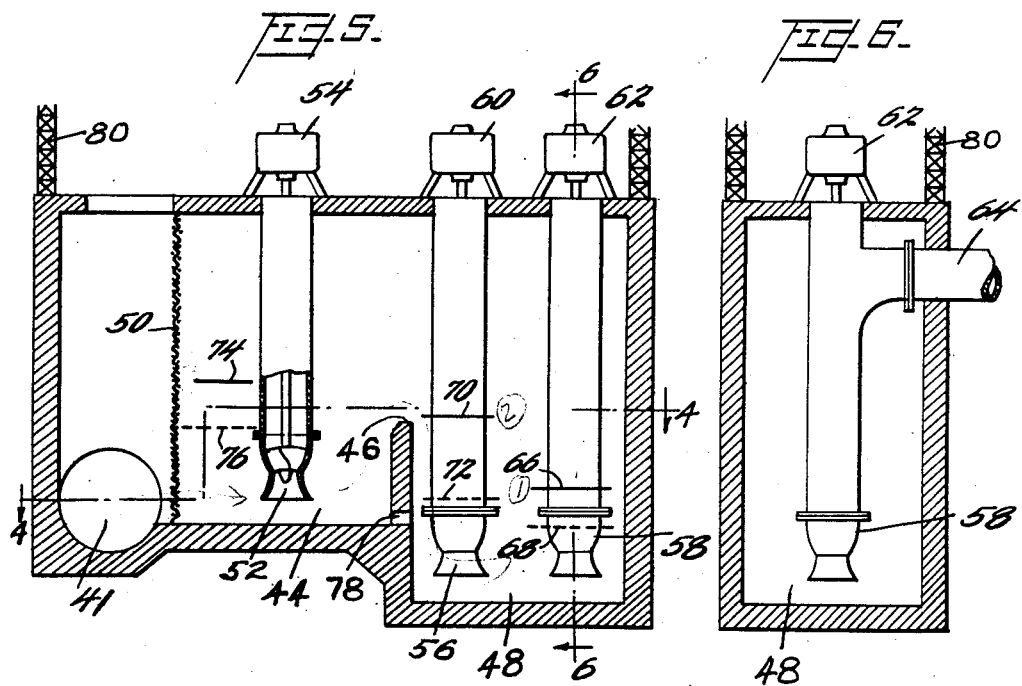

Nov. 26, 1940.  R. T. REGESTER  2,222,595
MEANS FOR DISPOSING VARIABLE INFLOW LIQUID FROM A CONDUIT
Filed Dec. 22, 1939  3 Sheets-Sheet 3
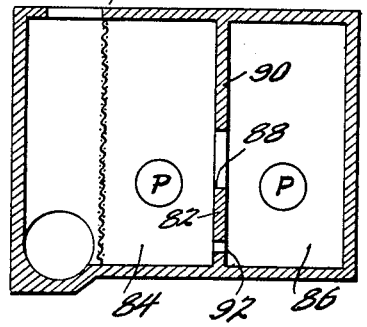
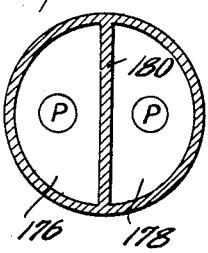
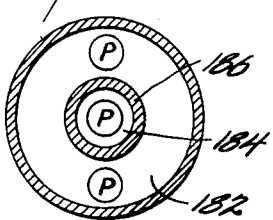
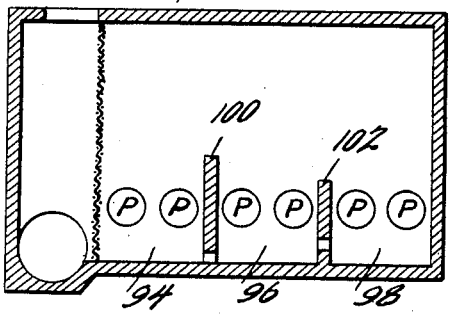
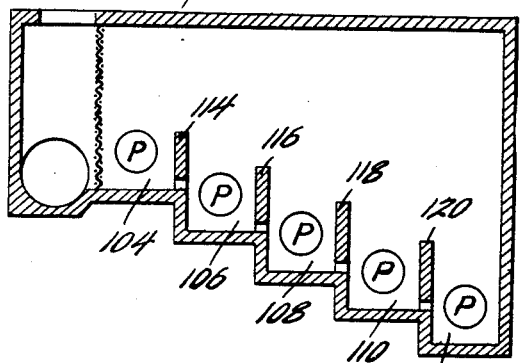
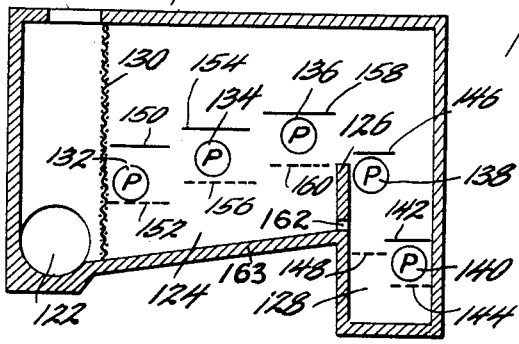
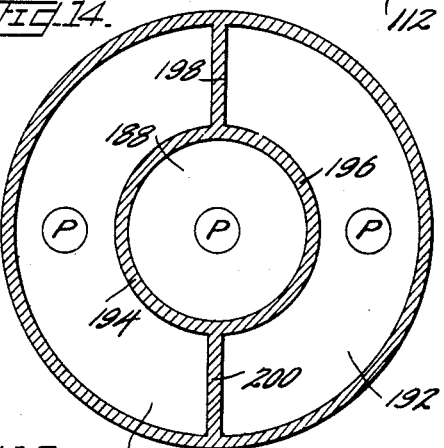
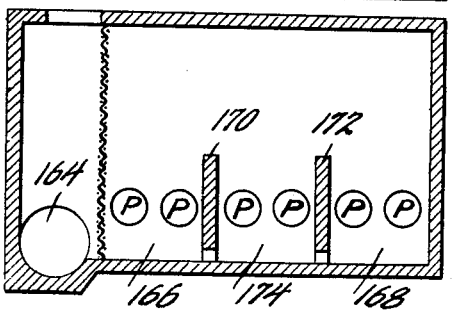
Inventor
ROBERT T. REGESTER
By Chas. Silver
Attorney Patented Nov. 26, 1940

2,222,595

UNITED STATES PATENT OFFICE 2,222,595

MEANS FOR DISPOSING VARIABLE INFLOW LIQUID FROM A CONDUIT

Robert T. Regester, Baltimore, Md., assignor of one-half to Gustav J. Requardt, Baltimore, Md.

Application December 22, 1939, Serial No. 310,624

13 Claims. (Cl. 103—26)

This invention relates to method and means for pumping and disposing liquid of variable rate of inflow from a conduit or channel, and has particular application to the pumping and disposal of the storm water from sewers during and immediately after periods of rainfall, to the pumping and disposal of the sewage and wastes from sewers during normal daily usage, to the pumping and disposal of the water from conduits or channels for irrigation purposes, to the pumping and disposal of liquids from industrial processes or sources during normal plant operation, to the pumping and disposal of drainage liquid from the drains in buildings or factories, and to the pumping and disposal of bilge water from the bilges of ships.

The methods and means heretofore employed for these purposes have been found disadvantageous. Some of the objections are:

(1) The inadequate flexibility of the number and individual capacities of pumps for proper and economical operation under the variations of rate of inflow of liquid to the pumping station.

(2) Frequent starting and stopping of pumping units, particularly during the relatively short critical intervals of time when the capacity of the pumping unit in operation is reached and the pumping must be augmented by starting and operating another pumping unit.

(3) The requirement of an undesirable amount of manual regulation or of elaborate automatic control to maintain the discharge equal to the rate of inflow.

(4) The requirement of an inconvenient timing in pump operation.

(5) The need for reservoirs to provide equalizing storage and to eliminate surges in the conduit or channel when the pumpage substantially exceeds the inflow, or vice versa.

The above disadvantages may be seen from the following customary operations at prior stations or installations.

Since conditions of low flow rate into the station exist more prevalently than conditions of high flow rate, it is desirable to have at these pumping stations a small pump to take care of the low flow rates. To avoid frequent starting and stopping of such small pump, occasioned by an abrupt fall in the water level of its well due to temporary excess discharge through the pump above inflow to its well, this small pump should be a variable unit, generally a variable speed unit. Such variable unit requires continuous regulation as pumpage increases from minimum to full capacity of the pump. For example, if the pump unit next to go into action, when the rate of inflow has increased to the full capacity of the variable speed unit, is one of constant capacity and equal to the maximum capacity of the variable capacity pump, the instant the second unit goes into action, it will handle all of the inflow of water and there will be no work for the unit of variable capacity until the rate of inflow increases. The variable capacity unit will, therefore, go out of operation until the rate of inflow exceeds the output of the second unit. When, however, the rate of inflow exceeds the capacity of the second pump unit, the variable unit is started and regulated to meet the continued rise of inflow until the full capacities of both pump units are reached, at which time a third pumping unit must go into operation.

If this third pump unit is also a constant capacity unit and of the same capacity as the second unit, just as soon as the third unit goes into operation the combined pumpage of the second and third units will temporarily take care of the inflow of water and the variable capacity pump will go out of operation as previously described when the second unit was cut in. As the rate of inflow increases, the variable capacity pump is again started and regulated to handle the water as the rate of inflow increases until it equals the combined full capacities of the three units.

To take care of further increase of inflow of water, additional pumping units must be cut in successively, as the full capacities of the then operating pump units are reached. In all such cases, when an additional pumping unit is cut in, the starting and stopping of the variable capacity pump and its manual regulation must be repeated as it discharges over the range from its minimum to its maximum capacities. This not only requires much manual labor and attention and subjects the pumping unit to much wear and tear, but further requires a large number of pumping units where there is a great difference between the normal rate of inflow and the maximum rate of inflow.

If, in order to reduce the number of pumping units, any of the constant capacity pumps, for example, the second pumping unit, is of greater capacity than the maximum capacity of the variable capacity small pumping unit, after this larger pumping unit is placed in operation when the rate of inflow becomes equal to the full capacity of the variable capacity smaller unit, the pumpage by the larger unit will exceed the rate of inflow. This will not only leave no work for the small unit, which will go out of operation, but a quantity of water greater than the rate of inflow at such time will be required if the second larger pump unit is to continue operation until the rate of inflow rises to equal the capacity of this larger pumping unit. To meet this situation a reservoir is provided. As the rate of inflow passes the capacity of the large pump unit, the smaller variable capacity pump is again cut in and regulated until the rate of inflow equals the full capacities of both units.

To take care of further increase in the rate of inflow, an additional pumping unit must be cut in. If this latter pumping unit is of greater capacity than that of the variable pumping unit, the same procedure of stopping and then starting and regulation of the variable capacity pumping unit must be repeated as in the period immediately following the cutting in of the second pumping unit. Also, the same procedure must take place as each successive pumping unit goes into operation.

To overcome some of the disadvantages in the use of one variable capacity pump unit with one or more constant capacity pump units, either equaling or exceeding the full capacity of the variable capacity pump unit, two or more variable capacity pump units are sometimes employed. In such systems, through proper choice of the relative capacities of the variable capacity pump units and the constant capacity pump units, the objectionable, complete cessation of operation of the variable capacity pumps may be overcome. However, the need for constant regulation of these variable capacity pump units still exists. Such regulation is very undesirable, because it is either manual regulation with its attending difficulties and expense or else elaborate electrical control. The latter necessitates more expensive and cumbersome motor equipment and entails excessive loss of power resulting from the insertion of resistance to reduce the speed and thereby the capacity of the pump.

Among the objects of this invention is to provide a method and means for pumping and disposing variable rate of inflow liquid from a conduit or channel, under the conditions heretofore described, that will overcome the disadvantages incident to the prior methods and means and to accomplish the desired results by method and means which are simple, efficient and economical, and which require a minimum amount of manual attention.

It is a further object of this invention to eliminate the necessity for reservoirs and thus dispense with the disadvantages of their use and effect a saving in outlay for equipment and maintenance.

More specifically, it is an object of this invention to utilize the advantages of operation with constant speed pump units having fixed blade impellers. An inherent characteristic of these pumps is that the capacity of the pump decreases with increase of head, and vice versa. That is, as the level of the body of water in the suction well rises with discharge taking place at the same elevation, the pump head decreases and the capacity is increased because the liquid is lifted through lesser elevations.

Another object of this invention is to effect continuity in operation of a plurality of pumps, served by two suction wells in series, by having one or more of the pumps discharging from the first suction well which overflows into a following suction well and another set of one or more pumping units discharging from the following suction well.

Other, further and more specific objects of this invention will become readily apparent to persons skilled in the art from a consideration of the following description when taken in conjunction with the accompanying drawings wherein:

Fig. 1 is a horizontal cross-section along line 1—1 of Fig. 2 of a storm water pumping station employing two centrifugal pumps.

Fig. 2 is a vertical section on line 2—2 of Fig. 1.

Fig. 3 is a vertical section along line 3—3 of Fig. 1.

Fig. 4 is a horizontal cross-section along line 4—4 of Fig. 5 of a storm water pumping station employing three propeller pumps.

Fig. 5 is a vertical section on line 5—5 of Fig. 4.

Fig. 6 is a vertical section on line 6—6 of Fig. 4.

Fig. 7 is a vertical section through a storm water pumping station illustrating diagrammatically a modified means for separating the wells of the pumping station.

Figs. 8 and 9 are schematic views in plan, showing the use of two pump wells of particular design in the practice of the present invention.

Fig. 10 is a vertical section through a pumping station illustrating diagrammatically the use of three wells.

Fig. 11 is a view similar to Fig. 10 and illustrating diagrammatically the use of five wells having a single pump in each well.

Fig. 12 is a vertical section through a pumping station illustrating diagrammatically the use of two pumps in one of the wells and three pumps in the other well.

Fig. 13 is a view similar to Fig. 9 and illustrating diagrammatically the use of three wells, the liquid from two of which flows over into the other well.

Fig. 14 is a schematic view in plan, showing the use of three pump wells of particular design, the liquid from two of which flows into the other well.

In the pumping station illustrated in Figs. 1 to 3, the water from a conduit, such as the sewer 2 provided with the flap or sluice gate 4 (closed during times of pumping), passes into a first well 6 and as the level of the liquid rises it flows over the weir 8 into the following well 10. In order to keep out debris from the wells, a screen or bar rack 12 or other suitable means is provided. A centrifugal pump 14 discharges water from well 4 and another centrifugal pump 16 likewise serves well 10. This pump 16 is operated by its motor 18 through the shaft 20 and the liquid is discharged through the outlet conduit 22 to a river or other suitable place. The pump 14 is similarly operated by its motor and the connecting shaft (not shown). The pump 14 draws liquid through the inlet pipe 24, preferably extending to the bottom of the well 6, while the pump 16 is similarly served by the pipe 26 extending to the bottom of the well 10.

The pump 16 is regulated to start pumping water from the well 10 when the water level reaches a definite height, such as indicated by the line 28, and to continue pumping as long as the water level stays above another definite lower level, for example, such as indicated by the line 30.

The pump 14 is regulated to start pumping water from the well 6 when the water level reaches a definite height, such as indicated by line 32, and to continue pumping as long as the water level stays above another definite lower level, for example, such as indicated by the line 34.

Each of these pumps 14 and 16 have a specific pumpage for a rated head or a given lift. For example, if line 35 represents the elevation to which the water is to be raised by a given pump for discharge, there is a definite elevation, for example line 36 in Fig. 2, from which level water raised by such pump to the discharge elevation 35 will be discharged at the specific pumpage for the rated head. The vertical distance AB between lines 35 and 36 is the rated head. As the water level rises from the level 36 to the level 35 the distance through which the water must be raised by the pump decreases and the pumpage increases correspondingly, exceeding the specific pumpage for the rated head.

If the water in the well 10 is at a level below line 36, as is the case before the water rises to the level 36 or after the water level recedes below line 36, the lift or distance through which the water must be raised by the pump is greater than AB and the pumpage will be less than the specific pumpage for the rated head. As the pumpage decreases with increase of lift, a level is reached at which the pumpage reaches the vanishing point, such as line 37 in Fig. 2, commonly known as shut-off point. The vertical distance BC between lines 36 and 37 is the draw-down of the pump.

The pump characteristic graphs for pumps, such as pumps 14 and 16, plotted with lift as ordinates and pumpage as abscissae have been shown by experiment to be curves rather than straight lines, the contours and abruptness of the curves depending upon the inherent characteristics of the pumping unit.

Each of these pumps may be regulated or adjusted by suitable means, such as the float switch 38, to start pumping when the water rises to any desired level between the lines 37 and 35 and by other suitable means, such as the float switch 39, to discontinue pumping when the water recedes to any desired level between lines 37 and 35.

These pumps operate at constant speed. If it is desired to maintain a narrow range of pumpage, a pump should be employed having a pump characteristic curve which is steep or abrupt, thus providing little rise or fall in pumpage with rise or fall, respectively, of the water level in the well wherein the pump operates. Likewise, if it is desired to maintain a wide range of pumpage, a pump should be employed having a pump characteristic curve which is not steep, thereby providing large rise or fall in pumpage with rise or fall, respectively, of the water level in the well wherein the pump operates.

The present invention may be practiced with pumps of the same type pump characteristic curve for wide range as well as narrow range of pumpage where portions of such curve are less abrupt than other portions. If wide range of pumpage is desired, such pumps are regulated to be in operation only for the conditions where the curve shows wide variation of pumpage with variation in head. Similarly, if narrow range of pumpage is desired, such pumps are regulated to be in operation only for the conditions where the curve shows narrow variation in pumpage with variation in head.

As the water from the well 6 passes over the weir 8 into the well 10 and rises to the level 28, the pump 16 will begin to pump water from this well 10. If the rate of inflow from the sewer into the well 6 exceeds the rate of pumpage from the well 10, the water in this well 10 will rise and, when the water level passes the level of the weir 8, the water in both wells will rise until the level 32 is reached, at which time the pump 14 will begin to withdraw water from the well 6. Once this pump 14 is started, it will continue in operation until the water level recedes to the line 34. Also, the discharge by the pump 16 will continue until the water level in well 10 recedes to the line 30.

If we assume, for example, that the water level in well 10 is rising, the pumpage from the well 10 will rise when the pump 16 starts and gradually climb until the pump 14 begins to operate when the water level reaches line 32. Pumpage will correspond during the interval to the level of water in the well 10. This will cause the discharge to increase as the total pumping head decreases.

With the pump 14 also in operation, both pumps operating simultaneously will draw down the level of the water in well 10 due to a reduced overflow from well 6 until a balance between inflow and their combined discharge is reached. With a further continuous increase in the rate of inflow, the level of the water will again rise and the delivery of the pumps will keep pace with the inflow until the water level rises to the elevation where the combined discharge of both pumps reaches their maximum capacity.

For the best practical results, pump 14 and its range of operation should be selected to give a narrow range of pumpage around the level it is cut in; i. e. little rise or fall in pumpage with rise or fall, respectively, of the water level in well 6, but pump 16 and its range of operation should be selected to give a wide range of pumpage around the level it is cut in; i. e. a wide rise or fall in pumpage with rise or fall, respectively, of the water level in well 10.

The pump 14 will continue to discharge water as long as the water level in well 6 is above the line 34. The pump 16 will continue to discharge water as long as the water level in well 10 is above the line 30.

To avoid total cessation of flow at times of equalization when the pump 14 is cut in, one or more orifices 40 of limited size are provided to permit the desired minimum inflow of water from the well 6 to the well 10.

The bottom of the well 6 should be preferably elevated above the dry-weather depth of flow in the sewer 2. It is also desirable in some instances, to provide a small sump pump (not shown) in well 10, to keep it drained during periods of no flood.

In the pumping station illustrated in Figs. 4 to 6, the water from a conduit, such as the sewer 41 provided with the flap or sluice gate 42 (closed during time of pumping), passes into a first well 44 and as the level of the water rises it flows over the weir 46 into the following well 48. This station is provided with the screen 50. A propeller pump 52 operated by its motor 54 is disposed within the well 44 and other propeller pumps 56 and 58 operated by their respective motors 60 and 62 are disposed in well 48. These impeller pumps 52, 56 and 58 have their inlets near the bottoms of their respective wells and the liquid drawn by these pumps is discharged through suitable outlets, such as the conduit 64 connected to pump 58.

The pump 58 is regulated to start pumping water from the well 48 when the water level reaches a definite height, such as indicated by the line 66, and to continue pumping as long as the water level stays above another definite lower level, for example, such as indicated by the line 68. The pump 56 is regulated to start pumping water from the well 48 when the water level reaches a definite height, such as indicated by the line 70, and to continue pumping as long as the water level stays above another definite lower level, for example, such as indicated by the line 72. The pump 52 is regulated to start pumping water from the well 44 when the water level reaches a definite height, such as indicated by the line 74, and to continue pumping as long as the water level stays above another definite lower level, for example, such as indicated by the line 76.

Each of these pumps 52, 56 and 58 have a specific pumpage for a rated head or a given lift, similar to those of the centrifugal pumps 14 and 16 in Figs. 1 to 3. For the best practical results, pumps 52 and 56 and their respective ranges of operation should be selected to give narrow ranges of pumpage around the respective levels they are cut in; i. e. little rise or fall in pumpage with rise or fall, respectively, of the water level in their respective wells, but pump 58 and its range of operation should be selected to give a wide range of pumpage around the level it is cut in; i. e. a wide rise or fall in pumpage with rise or fall, respectively, of the water level in well 48.

As the water from the well 44 passes over the weir 46 into the well 48 and rises to the level 66, the pump 58 will begin to pump water from this well 48. If the rate of overflow into well 48 exceeds the rate of pumpage from the well 48, the water in this well 48 will rise and, when the water level rises to the level 70, the pump 56 will also begin to withdraw water from the well 48.

If now the rate of inflow from the sewer 41 into the well 44 exceeds the rate of combined discharge of the pumps 56 and 58, the water level will rise and, when the water level reaches the elevation designated by the line 74, pump 52 will begin to withdraw water from the well 44. Once pump 58 is started, it will continue in operation until the water level recedes to the line 68. Likewise, the discharge by the pump 56 will continue until the water level recedes to the line 72, while the discharge by the pump 52 will continue until the water level recedes to the line 76.

When the water level in well 48 is rising, the pumpage from well 48 will rise when the pump 58 starts and gradually climb until pump 56 begins to operate when the water level reaches line 70. Pumpage will correspond during the interval to the level of water in the well 48. This will cause the discharge to increase as the total pumping head decreases. With the pump 56 also in operation, both pumps operating simultaneously will draw down the level of the water in well 48 until a balance between overflow into well 48 and their combined discharge is reached. With a further continuous increase in the rate of inflow, the level of the water will again rise and delivery of the pumps 56 and 58 will keep pace with the inflow until the water level rises above the weir 46.

As the water level rises further and reaches the line 74, pump 52 will begin to operate. With all 3 pumps operating simultaneously, the level of the water will be drawn down until a balance between inflow and their combined discharge is reached. With a continuous increase in the rate of inflow, the level of the water will again rise and the delivery of the pumps will keep pace with the inflow until the water level rises to the elevation where the combined discharge of the 3 pumps reaches their maximum capacity.

The pump 52 will continue to discharge water as long as the water level in well 44 is above the line 76, the pump 56 will continue to discharge water as long as the water level in well 48 is above the line 72, and the pump 58 will continue to discharge water from the well 48 as long as the water level in the well 48 is above the line 68.

One or more orifices 78, of limited size, may also be provided to permit the minimum inflow of water from the well 44 to the well 48.

The constructions shown in Figs. 1 to 6 represent pumping stations particularly adapted for handling storm water. The pumps are preferably provided with independent discharge pipes with outlets near the top of the river slope of the flood protection levee. If desired, however, the outlets from several pumps may enter a larger manifold outlet, preferably provided with a suitable discharge weir (not shown) for each pump. These constructions dispense with the need for large check valves, gate valves or flap valves in the individual discharge pipes. The pumps may be operated with a more stable discharge than the mechanism heretofore employed and against a constant discharge elevation. The constructions here shown may be operated with a minimum of labor and without the need of added reservoir capacity.

If desired, suitable super structure 80 may be provided at these stations. The specific construction of the float or other means for placing the pumps into and out of action form no part of this invention. Any of the many efficient devices on the market for such purposes may be employed.

When repairs are needed, the propeller pumps of Figs. 4 to 6 may be lifted from their casings. If centrifugal pumps, such as shown in Figs. 1 to 3, are used, it will be found convenient to provide valves 81 to permit shut off of the pump from the well in case of repairs.

An alternative means is to substitute stop planks for the screen and thus shut off the station in time of repair or discontinuance.

In the modification of the present invention shown in Fig. 7, the wall 82 between the wells 84 and 86 and having the weir 88 extends above the weir, as shown at 90. In this construction, the water from well 84 can only pass to the well 86 through the weir 88 and the lower orifice 92.

In the modification shown in Fig. 10, a first well 94, a first following well 96 and a succeeding following well 98 are provided. Water flows from the well 94 over the weir 100 into the well 96 from which it flows over the weir 102 into well 98. Each of these wells may be served by one or more pumps of the type shown in Figs. 1 to 6.

In the modification shown in Fig. 11, a first well 104 and a series of successive following wells 106, 108, 110 and 112 are provided. Water from well 104 flows over the weir 114 to well 106 from which water flows over the weir 116 into well 108. From this well 108 water flows over the weir 118 into well 110. From well 110 water flows over the weir 120 into well 112. Each of these wells 104, 106, 108, 110 and 112 are served by one or more pumps of the type shown in Figs. 1 to 6. In the operation of multiple-well stations having 3 or more wells, such as shown in Figs. 10 and 11, the pumps of the last of the series of following wells begin to operate first and the pumps of the next adjacent wells are cut in successively as the water level rises to the predetermined heights for which each successive pump is set to begin operation.

For the best practical results, the pump first to begin discharging from the last of the series of following wells and its range of operation should be selected to give a wide range of pumpage around the level it is cut in; i. e. a wide rise or fall in pumpage with rise or fall, respectively of the water in its well. The pumps, beginning operation at higher water level than said first pump, and their respective ranges of operation should be selected to give narrow ranges of pumpage around the respective levels they are cut in; i. e. little rise or fall in pumpage with rise or fall, respectively, of the water level in their respective wells.

In some instances, particularly where more than one pump is employed for the following well of a double-well construction or for the last of the series of following wells in a multiple-well construction, it may be advantageous to have the pump, beginning operation second to the first pump starting operation, of a wider range of pumpage than those of the pumps which are cut in at a higher water level. The range of pumpage of such pump, second in operation, may in such instances be as wide as that of the pump, first in operation, or of a range intermediate between said wide range and the narrower range or ranges of the other pump or pumps.

By having the one or two (in special cases) pumps of wider range of pumpage for the following well of double-well construction and for the last of the series of following wells of multiple-well construction, whatever rapid and wide variation in water level occurs in the system, when a pump is cut in, is confined to one well. The water levels in the other wells suffer little or no recession while the rate of inflow into the first well is increasing.

In multiple-well stations, the wells may be arranged in open or closed line or chain of contour and design to meet the needs and fancy of the user.

The bottom of the wells may be below, even with or above that of the sewer or other conduit supplying water thereto. With respect to each other, the bottoms of the individual wells may be at the same or different levels. If the bottom is at a lower level, the water level at which the pump may be regulated to go out of action can be lowered. This has been found advantageous in some instances for the well served by a pump of wide range of pumpage.

In using this invention for handling flood waters from a conduit, such as a sewer, the top of the weir over which water flows from the first well is preferably placed at about the same elevation as the top of the sewer. With no flood, the sewer can flow to the river to as much as the full sewer capacity, without filling the first well. When the flap or sluice gate on the sewer outlet to the river closes (as is the case when the river rises above the mouth of the sewer), storm water and sewage will be backed up to the weir elevation and will overflow into the first well, from which the water overflows to the one or more following wells, as heretofore described.

In the modification of pump station illustrated in Fig. 12, the water from the conduit or sewer 122 passes into a first well 124, and as the level of the water rises it flows over the weir 126 into the following well 128. This station is provided with the screen 130. Three pumps 132, 134 and 136 discharge from well 124 and two pumps 138 and 140 discharge from well 128. These pumps may be of the centrifugal type shown in Figs. 1 to 3 or the propeller type shown in Figs. 4 to 6. These pumps have their inlets near the bottoms of their respective wells and the liquid withdrawn by these pumps is discharged through suitable outlets (not shown).

The pump 140 is regulated to start pumping water from the well 128 when the water level reaches a definite height, such as indicated by the line 142, and to continue pumping as long as the water level stays above another definite lower level, for example, such as indicated by the line 144. The pump 138 is regulated to start pumping water from the well 128 when the water level reaches a definite height, such as indicated by the line 146, and to continue pumping as long as the water level stays above another definite lower level, for example, such as indicated by the line 148. The pump 132 is regulated to start pumping water from the well 124 when the water level reaches a definite height, such as indicated by the line 150 and to continue pumping as long as the water level stays above another definite lower level, for example, such as indicated by the line 152. The pump 134 is regulated to start pumping water from the well 124 when the water level reaches a definite height, such as indicated by the line 154, and to continue pumping as long as the water level stays above another definite lower level, for example, such as indicated by the line 156. The pump 136 is regulated to start pumping water from the well 124, when the water level reaches a definite height, such as indicated by the line 158, and to continue pumping as long as the water level stays above another definite lower level, for example, such as indicated by the line 160.

Each of these pumps 132, 134, 136, 138 and 140 have a specific pumpage for a rated head or a given lift similar to the pumps shown in Figs. 1 to 6. For the best practical results, pumps 132, 134 and 136, and their respective ranges of operation should be selected to give narrow ranges of pumpage around the respective levels they are cut in; i. e. little rise or fall in pumpage with rise or fall, respectively, of the water level in well 124. Pump 140 and its range of operation should be selected to give a wide range of pumpage around the level it is cut in; i. e. a wide rise or fall in pumpage with rise or fall, respectively, of the water level in well 128. The range of pumpage of pump 138 at the level it is cut in may be either narrow like pumps 132, 134 and 136 in well 124, wide like pump 140 or intermediate between said narrow ranges and said wide range.

As the water rises in wells 124 and 128 and the pumps successively begin operating as heretofore described, the temporary readjustment of the level of the water in the wells 124 and 128 takes place in a manner similar to that described in the station shown in Figs. 4 to 6. As each of the pumps 138, 136, 134 and 132 are cut in successively, the level of water in well 128 is drawn down until a balance between inflow and the combined discharge of the pumps in operation is reached. If the inflow into well 124 is on the increase, the water level in well 124 will undergo little or no recession or rise while a balance between inflow and the combined discharge of the pumps in operation is being reached.

Once started, pump 140 will continue to discharge water until the water level in well 128 reaches the line 144, pump 138 will continue to discharge water until the water level in well 128 reaches the line 148, pump 132 will continue to discharge water from the well 124 until the water level in the latter well reaches the line 152, pump 134 will continue to discharge water from the well 124 until the water level in the latter well reaches the line 156 and pump 136 will continue to discharge water from the well 124 until the water level in well 124 reaches the line 160.

One or more orifices 162 of limited size may also be provided to permit the minimum inflow of water from the well 124 to the well 128. The bottom 163 of the well 124 is shown sloping upward from the sewer 122 to the wall having the weir 126. This allows the water to drain back into the sewer when the pumpage ceases.

In the modification shown in Fig. 13, the water from the conduit or sewer 164 passes into the two first wells 166 and 168. Each of these two wells 166 and 168 may be connected to receive the water direct from the sewer 164 or, if desired, one of these wells, for example well 166, may receive the water from the sewer 164 and deliver the water to the well 168 by suitable connection (not shown) permitting a free flow of water between these wells. As the water levels in the wells 166 and 168 rise, the rising water will travel over the weirs 170 and 172 into a following well 174. Each of these wells 166, 168 and 174 may be served by one or more pumps of the type disclosed in Figs. 1 to 6.

In Figs. 8, 9 and 14, the schematic views show the adaptation of the present invention to stations of circular section. If desired, a plurality of pumps may be employed for one or more of the wells in lieu of a single pump.

In Fig. 8, the first well 176 and following well 178 are semi-circular and separated by the wall 180 provided with a suitable weir.

In Fig. 9, the first well 182 surrounds the following well 184, separated therefrom by the wall 186 provided with a suitable weir.

In Fig. 14, the following well 188 is surrounded by the first wells 190 and 192 and separated therefrom by the walls 194 and 196, respectively. These walls 194 and 196 are provided with suitable weirs. The wells 190 and 192 are separated from each other by the walls 198 and 200. Each of the wells 190 and 192 may be connected to receive the water direct from the sewer or other source of supply, or, if desired, one of these wells, for example, well 190, may receive the water from the sewer or other source and deliver the water to well 192 by suitable connection (not shown) permitting a free flow of liquid between these wells.

From the foregoing, it will be seen that in practicing the present invention, adequate facilities are provided for handling water of varying rate of inflow from the minimum capacity output of the first pumping unit put in operation in any of the following wells to the maximum pumpage when all of the pumping units at any station operate simultaneously and at full capacity. This is accomplished with a minimum of manual labor and without cessation of pumping by any of the pumping units, once they are cut in, during the increase in the rate of inflow of water into the station. It is only when the water level recedes in the station, as when a flood subsides, that the pumps are successively and automatically put out of operation.

It will be seen that the present invention is applicable to stations wherein each well is pumped by a single pumping unit as well as wherein one or more of the wells are served by a plurality of pumping units. The pumping units which are cut in subsequent to the first pump unit may be for less pumpage, the same pumpage or greater pumpage than the pumpage of the said first pump unit at the time of said cut in. A rapid step-up in the pumpage may be accomplished with a fewer number of units (by cutting in pump units of greater pumpage than the pumpage by said first pump unit at the time of said cut in) than by the methods and means heretofore employed. The capacity of any larger capacity pump at the cut in elevation should not exceed the combined discharge at such level of all the pumps in the well served by the pump first going into operation. These advantages are secured without the attending disadvantages incident to the prior methods and means heretofore described. By the present invention, no reservoir is needed, thereby avoiding the disadvantages commonly associated with reservoirs, such as the sedimentation of organic solids resulting in the accumulation of putrescible sludge.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a system for disposing variable inflow liquid from a conduit, a first well adapted to receive liquid from said conduit, a following well adapted to receive overflow liquid from said first well, a pumping unit for said following well, means for starting operation of said pumping unit when the liquid level in said following well rises to an intermediate level between the elevation of the bottom of said following well and said overflow level, a second pumping unit for said first well and means for starting operation of said second pumping unit when the liquid level in said first well rises to a predetermined level above said overflow level.

2. In a system for disposing variable inflow liquid from a conduit, a first well adapted to receive liquid from said conduit, a following well adapted to receive overflow liquid from said first well, a pumping unit for said following well, means for starting operation of said pumping unit when the liquid level in said following well rises to a predetermined level, a second pumping unit for said first well and means for starting operation of said second pumping unit when the liquid level in said first well rises to another predetermined level, each of said pumping units having means for increasing the pumpage from its respective well with the rise of liquid level therein and for decreasing the pumpage from its respective well with the lowering of the liquid level therein.

3. In a system for disposing variable inflow liquid from a conduit as claimed in claim 2, wherein the pumpage by the pumping unit of the following well has a greater rise and fall per unit rise or fall, respectively, of liquid level in said following well than the rise or fall in pumpage by the pumping unit of the first well per unit rise or fall, respectively, of liquid level in said first well.

4. In a system for disposing variable inflow liquid from a conduit as claimed in claim 2, wherein the pumpage by the pumping unit of the following well has a greater rise and fall per unit rise or fall, respectively, of liquid level in said following well than the rise or fall in pumpage by the pumping unit of the first well per unit rise or fall, respectively, of liquid level in said first well and wherein the pumpage by the pumping unit of the first well at the time said pumping unit for the first well is started does not exceed the pumpage at such time of the pumping unit of the following well.

5. In a system for disposing variable inflow liquid from a conduit, a first well adapted to receive liquid from said conduit, a following well adapted to receive overflow liquid from said first well, a wall between said wells and having a weir for regulating the level of overflow from the first well to the following well, an orifice through said wall below said overflow level, a pumping unit for said following well, means for starting operation of said pumping unit when the liquid level in said following well rises to a predetermined level, a second pumping unit for said first well and means for starting operation of said second pumping unit when the liquid level in said first well rises to another predetermined level, each of said pumping units being of constant speed and having means for increasing the pumpage from its respective well with rise of liquid level therein and for decreasing the pumpage from its respective well with the lowering of the liquid level therein.

6. In a system for disposing variable inflow liquid from a conduit as claimed in claim 5, wherein the pumpage by the pumping unit of the following well has a greater rise and fall per unit rise or fall, respectively, of liquid level in said following well than the rise or fall in pumpage by the pumping unit of the first well per unit rise or fall, respectively, of liquid level in said first well, and wherein the pumpage by the pumping unit of the first well at the time said pumping unit for the first well is started does not exceed the pumpage at such time of the pumping unit of the following well.

7. In a system for disposing variable inflow liquid from a conduit, a first well adapted to receive liquid from said conduit and having a base with an upward slope from said conduit to a wall, a following well on the other side of said wall adapted to receive overflow liquid from said first well, said wall serving as separating means between said wells and having a weir for regulating the level of overflow from the first well to the following well, an orifice through said wall below said overflow level, a pumping unit for said following well, means for starting operation of said pumping unit when the liquid level in said following well rises to a predetermined level, a second pumping unit for said first well and means for starting operation of said second pumping unit when the liquid level in said first well rises to another predetermined level, each of said pumping units being of constant speed and having means for increasing the pumpage from its respective well with rise of liquid level therein and for decreasing the pumpage from its respective well with the lowering of the liquid level therein.

8. In a system for disposing variable inflow liquid from a conduit, a first well adapted to receive liquid from said conduit, a following well adapted to receive overflow liquid from said first well, a plurality of pumping units for said following well, means for starting operation of said pumping units when the liquid within said following well rises to predetermined levels corresponding to each pumping unit, a pumping unit for said first well, means for starting operation of said latter pumping unit when the liquid level in said first well rises to another predetermined level, each of said pumping units being of constant speed and having means for increasing the pumpage from its respective well with rise of liquid level therein and for decreasing the pumpage from its respective well with the lowering of the liquid level therein.

9. In a system for disposing variable inflow liquid from a conduit, a first well adapted to receive liquid from said conduit, a following well adapted to receive overflow liquid from said first well, a pumping unit for said following well, means for starting operation of said pumping unit when the liquid level in said following well rises to a predetermined level, a plurality of pumping units for said first well, means for starting operation of said latter pumping units when the liquid within said first well rises to predetermined levels corresponding to each of said latter pumping units, each of said pumping units being of constant speed and having means for increasing the pumpage from its respective well with rise of liquid level therein and for decreasing the pumpage from its respective well with the lowering of the liquid level therein.

10. In a system for disposing variable inflow liquid from a conduit, a first well adapted to receive liquid from said conduit, a following well adapted to receive overflow liquid from said first well, a plurality of pumping units for said following well, means for starting operation of said pumping units when the liquid within said following well rises to predetermined levels corresponding to each pumping unit, another plurality of pumping units for said first well, means for starting operation of said latter pumping units when the liquid within said first well rises to predetermined levels corresponding to each of said latter pumping units, each of said pumping units being of constant speed and having means for increasing the pumpage from its respective well with rise of liquid level therein and for decreasing the pumpage from its respective well with the lowering of the liquid level therein.

11. In a system for disposing variable inflow liquid from a conduit as claimed in claim 10, wherein the pumpage by a pumping unit of the following well has a greater rise and fall per unit rise or fall, respectively, of liquid level in said following well than the rise or fall in pumpage by each of the pumping units of the first well per unit rise or fall, respectively, of liquid level in said first well, and wherein the pumpage by the pumping units of the first well at the time each of said pumping units of the first well is started does not exceed the pumpage at such time of all of the pumping units of the following well.

12. In a system for disposing variable inflow liquid from a conduit, a plurality of first wells, a following well adapted to receive overflow liquid from said first wells, a pumping unit for said following well, means for starting operation of said pumping unit when the liquid level in said following well rises to a predetermined level, a pumping unit for each of said first wells, means for starting operation of said latter pumping units when the liquid level in said first well rises to predetermined level for each of said latter pumping units, each of said pumping units being of constant speed and having means for increasing the pumpage from its respective well with rise of liquid level therein and for decreasing the pumpage from its respective well with the lowering of the liquid level therein.

13. In a system for disposing variable inflow liquid from a conduit, a first well, a plurality of following wells in series with said first well, one of said following wells being adapted to receive overflow liquid from said first well and to deliver its overflow liquid to the next following well, a separate pumping unit for each of said wells, means for starting operation of each pumping unit when the liquid within the well served by the pumping unit rises to the predetermined level corresponding to each pumping unit, each of said pumping units being of constant speed and having means for increasing the pumpage from its respective well with rise of liquid level therein and for decreasing the pumpage from its respective well with the lowering of the liquid level therein, the pumpage by a pumping unit of the last of the series of following wells having a greater rise and fall per unit rise or fall, respectively, of liquid level in said last well of the series than the rise or fall in pumpage by each of the pumping units of the other wells per unit rise or fall, respectively, of liquid level in said other wells, and the pumpage of liquid from the last of the series of following wells at the time each pumping unit of said other wells is cut in being at least equal to the pumpage by each pumping unit of the other wells at the time of such cut in.

ROBERT T. REGESTER.